United States Patent
Zhang et al.

(10) Patent No.: US 12,503,581 B2
(45) Date of Patent: Dec. 23, 2025

(54) FOAMED ARTICLE WITH EXCELLENT STIFFNESS PRESERVATION AND SUPERIOR SURFACE QUALITY

(71) Applicant: SABIC GLOBAL TECHNOLOGIES B.V., Bergen op Zoom (NL)

(72) Inventors: Junhua Zhang, Etten-Leur (NL); Dimphna Johanna Maria van Beek, Sittard (NL); Daniel Bande, Antwerp (BE); Kar-Man Raymond Chu, Maastricht (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 775 days.

(21) Appl. No.: 17/785,723

(22) PCT Filed: Dec. 18, 2020

(86) PCT No.: PCT/EP2020/087293
§ 371 (c)(1),
(2) Date: Jun. 15, 2022

(87) PCT Pub. No.: WO2021/130139
PCT Pub. Date: Jul. 1, 2021

(65) Prior Publication Data
US 2023/0056504 A1    Feb. 23, 2023

(30) Foreign Application Priority Data
Dec. 24, 2019    (EP) ..................................... 19219577

(51) Int. Cl.
*C08L 23/12*    (2006.01)

(52) U.S. Cl.
CPC ........... *C08L 23/12* (2013.01); *C08L 2203/14* (2013.01); *C08L 2205/025* (2013.01);
(Continued)

(58) Field of Classification Search
CPC .......... C08L 23/12; C08L 23/16; C08K 3/013
See application file for complete search history.

(56) References Cited

U.S. PATENT DOCUMENTS

| 5,017,714 | A | 5/1991 | Welborn, Jr. |
| 5,093,415 | A | 3/1992 | Brady, III et al. |

(Continued)

FOREIGN PATENT DOCUMENTS

| EP | 2669329 A1 | 12/2013 |
| EP | 3330315 A1 | 6/2018 |

(Continued)

OTHER PUBLICATIONS https://www.team-mfg.com/blog/melt-flow-index.html Melt Flow Index (MFI) and Polymer Processing by Team MFG (Year: 2025).*

(Continued)

*Primary Examiner* — Catherine S Branch
*Assistant Examiner* — Olga Lucia Donahue
(74) *Attorney, Agent, or Firm* — CANTOR COLBURN LLP

(57) ABSTRACT

The present invention relates to a foamed article comprising a polymer composition wherein the polymer composition comprises a first heterophasic propylene copolymer and an inorganic filler. The invention also relates to a process for the preparation of said foamed article and to the use of the foamed article for the preparation of automotive parts.

18 Claims, 2 Drawing Sheets

Figure 1:
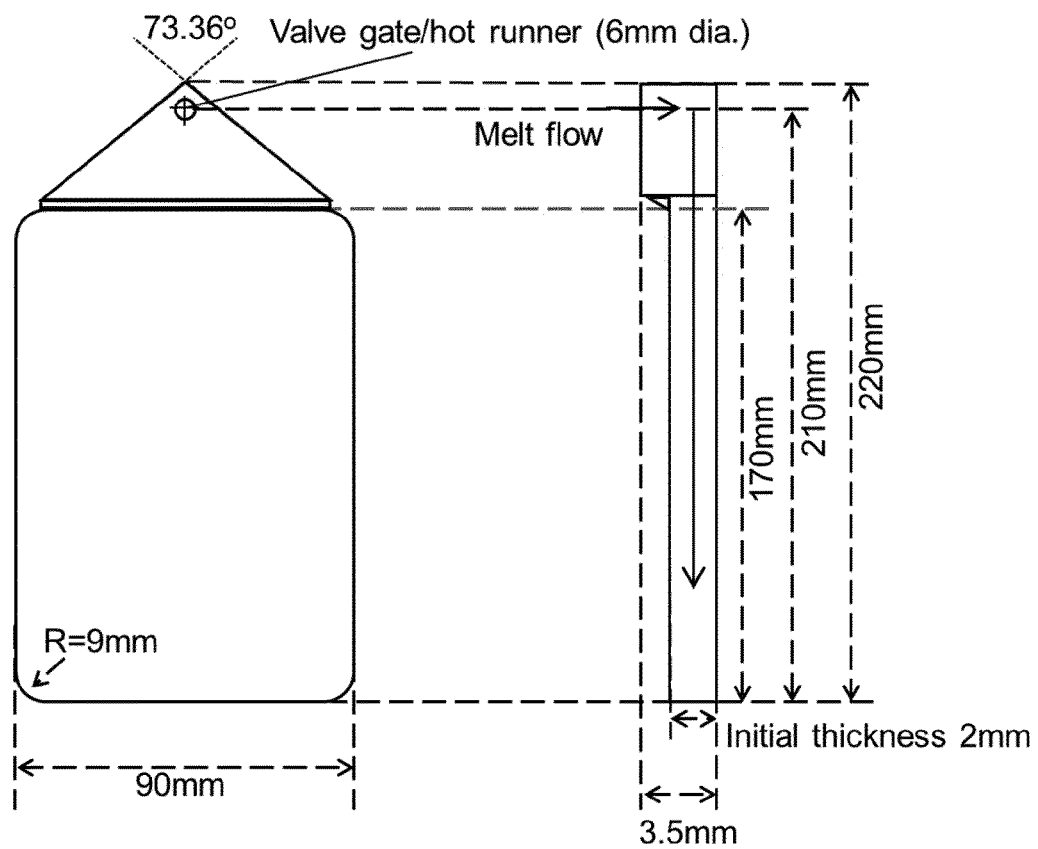

(52) U.S. Cl.
CPC ....... *C08L 2205/03* (2013.01); *C08L 2207/02* (2013.01); *C08L 2207/04* (2013.01)

(56) References Cited

U.S. PATENT DOCUMENTS

| | | | |
|---|---|---|---|
| 5,324,820 A | 6/1994 | Baxter | |
| 2020/0207960 A1* | 7/2020 | Mileva | ................... C08L 23/14 |

FOREIGN PATENT DOCUMENTS

| | | | |
|---|---|---|---|
| WO | 2015091810 A1 | 6/2015 | |
| WO | 2016005301 A1 | 1/2016 | |
| WO | 2016198344 A1 | 12/2016 | |
| WO | 2018099882 A1 | 6/2018 | |
| WO | 2018104524 A1 | 6/2018 | |
| WO | 2019002294 A1 | 1/2019 | |
| WO | 2019219678 A1 | 11/2019 | |

OTHER PUBLICATIONS

"Periodic System of the Elements"; Handbook of Chemistry and Physics, CRC Press, 70th Edition; 1989-1990; 1 page.

International Search Report for International Application No. PCT/EP2020/087293; International Filing Date Dec. 18, 2020; Date of Mailing Mar. 31, 2021; 4 pages.

Throne, James L. "Thermoplastic Foams", Sherwood Technologies, Inc., Sherwood Publishers, Hinckley, OH, 1996.

Written Opinion for International Application No. PCT/EP2020/087293; International Filing Date Dec. 18, 2020; Date of Mailing Mar. 31, 2021; 6 pages.

\* cited by examiner

FOAMED ARTICLE WITH EXCELLENT STIFFNESS PRESERVATION AND SUPERIOR SURFACE QUALITY

CROSS REFERENCE TO RELATED APPLICATIONS

This application is a National Stage application of PCT/EP2020/087293, filed Dec. 18, 2020, which claims the benefit of European Application No. 19219577.4, filed Dec. 24, 2019, both of which are incorporated by reference in their entirety herein.

The present invention relates to a foamed article comprising a polymer composition wherein the polymer composition comprises a first heterophasic propylene copolymer and an inorganic filler. The invention also relates to a process for the preparation of said foamed article and to the use of the foamed article for the preparation of automotive parts.

Foamed articles, especially polypropylene based foamed articles are widely used in automotive industry because of their low density and superior balance between impact resistance and stiffness. When a polypropylene based foamed article is used as an automotive interior trim, e.g. pillars, seat claddings, center console, etc, it is preferred that the foamed article has a good surface quality. Polypropylene compositions suitable for the preparation of such foamed article are known in the art. For example:

WO2018104524A1 discloses a polypropylene composition which is foamable in an injection molding process wherein the resulting foam is featured by a good cell structure, a good surface appearance and at the same time preserving good mechanical properties. The polypropylene composition comprises a) at least 20 wt.-%, based on the overall weight of the polypropylene composition, of a heterophasic propylene copolymer (HECOI) comprising i) a matrix (M) comprising a first propylene polymer (PP1), and ii) an elastomeric propylene copolymer (E), b) at least 30 wt.-%, based on the overall weight of the polypropylene composition, of a second propylene polymer (PP2), c) optionally a propylene homopolymer (H—PP3) having a melt flow rate MFR2 (230° C.) determined according to ISO 1133 below 50 g/10 min, d) an adhesion promoter (AP), and e) an inorganic filler (F), wherein said first propylene polymer (PP1) and said second propylene polymer (PP2) have melt flow rates MFR2 (230° C.) determined according to ISO 1133 above 50 g/10 min.

WO2016005301A1 discloses a mineral-filled propylene polymer composition suitable for preparing foamed articles, which have beside excellent flowability and stiffness, improved energy absorption, i.e. improved puncture resistance. The mineral-filled polypropylene composition comprises (A) 15-70 wt % of a first heterophasic polypropylene (HECO-1) having an MFR2 (ISO 1 133; 230° C.; 2.16 kg) in the range of 30-50 g/10 min, (B) 0-70 wt % of a second heterophasic polypropylene (HECO-2) having an MFR2 (ISO 1 133; 230° C.; 2.16 kg) in the range of 5-25 g/10 min, (C) 10-30 wt % of a high melt strength polypropylene (HMS-PP), (D) 5 to 20 wt % of an copolymer of ethylene and propylene or a C4-Cio alpha-olefin with a density of 0.860-0.910 g/cm3 and an MFR2 (ISO 1 133; 190° C.; 2.16 kg) in the range of 0.5-50 g/10 min (PE-COPO), (E) 5-25 wt % of a high-density polyethylene (HDPE), (F) 5-20 wt % of a mineral-filler and (G) 0-15 wt % of additives selected from antioxidants (AO), slip agents (SA), UV-stabilizers, anti-scratch additives, odour-scavengers and pigments, whereby the sum of the percentage amounts of the individual components of the composition is equal to 100 percent.

WO2018099882A1 discloses a foamable polypropylene composition applicable for the preparation of a foamed article having homogeneous/good surface appearance and mechanical properties. The polypropylene composition comprises a) a first heterophasic propylene copolymer (HECOI) having a comonomer content of the xylene soluble fraction (XCS) equal or above 40.0 mol-%, b) a second heterophasic propylene copolymer (HEC02) having a comonomer content of the xylene soluble fraction (XCS) below 39.0 mol-%>, c) an inorganic filler (F), d) optionally a high density polyethylene (HDPE), and e) optionally a plastomer (PL) being a copolymer of ethylene and a C4 to Cs a-olefin.

After the foaming process, the stiffness of the foamed article is typically lower than the stiffness of a solid article prepared from the same material. The ratio of the stiffness of the foamed article and the stiffness of the solid article prepared from the same material is the stiffness preservation. For automotive applications, it is preferred that foamed article has a highstiffness preservation after the foaming process, so that the foamed article can be used as such and does not require the mechanical support of another part with higher stiffness.

Hence it is the object of the present invention to provide a foamed article with a good surface quality and a goodstiffness preservation.

The object of the present invention is achieved by a foamed article comprising a polymer composition, wherein the polymer composition comprises a first heterophasic propylene copolymer (a) and an inorganic filler,
wherein the xylene soluble part of the first heterophasic propylene copolymer (a) is in the range from 18.1 to 27.6 wt % as determined by ISO16152:2005 based on the total amount of the first heterophasic propylene copolymer (a),
wherein the intrinsic viscosity of the xylene soluble part of the first heterophasic propylene copolymer (a) is in the range from 2.9 to 4.8 dl/g as measured according to ISO1628-1:2009 in decalin at 135° C.;
wherein the melt flow index (MFI) of the first heterophasic propylene copolymer (a) is in the range from 5.6 to 65.0 dg/min as determined according to ISO1133-1: 2011 at 230° C. with 2.16 kg load,
wherein the amount of the first heterophasic propylene copolymer (a) is in the range from 18.2 to 79.7 wt % based on the total amount of the polymer composition,
wherein the ash content of the polymer composition as measured according to ISO 3451-1:2008 at 600° C. for 4 hours is in the range from 3.5 to 30.2 wt % based on the total amount of the polymer composition,
wherein the foamed article according to the present invention has an expansion ratio in the range from 1.05 to 2.14, preferably in the range from 1.38 to 1.97, more preferably in the range from 1.49 to 1.82, wherein the expansion ratio is the ratio between the density of the polymer composition before foaming and that of the foamed article and wherein the density is measured according to ISO 1183-1:2012.

It was surprisingly found that the foamed article according to the invention has a superior surface quality and an excellent stiffness preservation comparing to the solid article prepared from the same material.

the First Heterophasic Propylene Copolymer

The first heterophasic propylene copolymer (a) preferably comprises a first propylene polymer (a1) as matrix and a first ethylene-α-olefin copolymer (a2) as dispersed phase.

The amount of the first propylene polymer (a1) is preferably in the range from 68 to 92 wt %, preferably in the range from 70 to 87 wt %, even more preferably in the range from 72 to 83 wt % based on the total amount of the first heterophasic propylene copolymer (a).

The first propylene polymer (a1) in the first heterophasic propylene copolymer (a) can be a propylene homopolymer or/and a propylene-α-olefin copolymer wherein the α-olefin has 2 or 4 to 20 carbon atoms, for example the propylene-α-olefin can be a propylene-ethylene copolymer or a propylene-butene copolymer. Preferably the first propylene polymer (a1) in the first heterophasic propylene copolymer (a) is a propylene homopolymer.

The melt flow index (MFI) of the first propylene polymer (a1) in the first heterophasic propylene copolymer (a) is preferably in the range from 20 to 120 dg/min, preferably from 40 to 110 dg/min, more preferably from 60 to 90 dg/min as determined according to ISO1133-1:2011 at 230° C. with 2.16 kg load.

The amount of the first ethylene-α-olefin copolymer (a2) is preferably in the range from 8 to 32 wt %, preferably in the range from 13 to 30 wt %, more preferably in the range from 17 to 28 wt % based on the total amount of the first heterophasic propylene copolymer (a).

In the first heterophasic propylene copolymer (a), the amount of the moiety derived from ethylene is preferably in the range from 35 to 49 wt %, more preferably in the range from 40 to 49 wt % based on the total amount of the first ethylene-α-olefin copolymer (a2).

Preferably, the moiety of α-olefin in the first ethylene-α-olefin copolymer (a2) in the first heterophasic propylene copolymer (a) is derived from at least one α-olefin having 3 to 20 carbon atoms, for example the first ethylene-α-olefin copolymer (a2) can be an ethylene-propylene copolymer, for example the first ethylene-α-olefin copolymer (a2) can be an ethylene-butene copolymer, for example the first ethylene-α-olefin copolymer (a2) can be an ethylene-hexene copolymer, for example the first ethylene-α-olefin copolymer (a2) can be an ethylene-octene copolymer, for example the first ethylene-α-olefin copolymer (a2) can be an ethylene-propylene-butene copolymer, for example the first ethylene-α-olefin copolymer (a2) can be an ethylene-propylene-hexene copolymer. Preferably the first ethylene-α-olefin copolymer (a2) in the first heterophasic propylene copolymer (a) is an ethylene-propylene copolymer The MFI of the first heterophasic propylene copolymer (a) is in the range from 5.6 to 65.0 dg/min, preferably in the range from 8.6 to 45.1 dg/min, preferably in the range from 11.2 to 25.3 dg/min, more preferably in the range from 12.3 to 18.2 dg/min as determined according to ISO1133-1:2011 at 230° C. with a 2.16 kg load.

The first heterophasic propylene copolymer (a) can be divided into a first xylene-soluble portion (First CXS) and a first xylene-insoluble portion (First CXI). The amount of the xylene-soluble portion is in the range from 18.1 to 27.6 wt %, preferably from 20.3 to 24.2 wt % based on the total amount of the first heterophasic propylene copolymer (a) as determined according to ISO16152:2005. The amount of the first xylene-insoluble portion based on the total amount of the first heterophasic propylene copolymer is calculated by the following equation:

First CXI=100 wt %−First CXS

The intrinsic viscosity of the first xylene-insoluble part (First CXI) of the first heterophasic propylene copolymer (a) $IV_{First\ CXI}$ is preferably in the range from 1.0 to 2.0 dl/g, more preferably from 1.0 to 1.8 dl/g, more preferably from 1.2 to 1.5 dl/g, as measured according to ISO1628-3:2010.

The intrinsic viscosity of the first xylene-soluble part (First CXS) of the first heterophasic propylene copolymer (a) $IV_{First\ CXI}$ is in the range from 2.9 to 4.8 dl/g, preferably in the range from 3.3 to 4.5 dl/g, preferably in the range from 3.8 to 4.3 dl/g as measured according to ISO1628-1:2009.

The first heterophasic propylene copolymer (a) is preferably a non-visbroken heterophasic propylene copolymer. The term non-visbroken is known in the art, yet for the avoidance of doubt it means that the materials was not treated such as to modify the molecular weight and/or the molecular weight distribution of the polymer directly after polymerisation. In other words, non-visbroken polymers are not treated with peroxides, radiation, or any other initiating source for chain breaking reactions to occur. An advantage of non-visbroken polypropylenes over vis-broken polypropylenes is that the former generally suffer less from the release of low molecular weight materials, such materials inherently being produced upon visbreaking and is not desired for automitve application. For the avoidance of doubt, the term reactor grade indicates that the copolymer is non-visbroken. The first heterophasic propylene copolymer (a) is preferably a reactor grade heterophasic propylene copolymer.

The process to produce the first heterophasic propylene copolymer (a) is known in the art. Preferably the first heterophasic propylene copolymer (a) is produced in a sequential polymerization process comprising at least two reactors, more preferably the polypropylene of the present invention is produced in a sequential polymerization process comprising at least three reactors.

The catalyst used in the preparation of the first heterophasic propylene copolymer (a) is also known in the art, for example a Ziegler-Natta catalyst, or a metallocene catalyst. Preferably the catalyst used to produce the first heterophasic propylene copolymer is free of phthalates, for example the catalyst comprises compounds of a transition metal of Group 4 to 6 of IUPAC, a Group 2 metal compound and an internal donor wherein said internal donor include but are not limited to 1,3-diethers, for example 9,9-bis(methoxymethyl) fluorene, optionally substituted malonates, maleates, succinates, glutarates, benzoic acid esters, cyclohexene-1,2-dicarboxylates, benzoates, citraconates, aminobenzoates, silyl esters and derivatives and/or mixtures thereof.

For example the catalyst used in the preparation of the first heterophasic propylene copolymer (a) is a Ziegler-Natta catalyst comprising a procatalyst, at least one external donor, a co-catalyst and an optional internal donor wherein the external electron donor is chosen from the group consisting of a compound having a structure according to Formula III $(R^{90})_2N\!-\!Si(OR^{91})_3$, a compound having a structure according to Formula IV: $(R^{92})Si(OR^{93})_3$ and mixtures thereof, wherein each of $R^{90}$, $R^{91}$, $R^{92}$ and $R^{93}$ groups are each independently a linear, branched or cyclic, substituted or unsubstituted alkyl having between 1 and 10 carbon atoms, preferably a linear unsubstituted alkyl having between 1 and 8 carbon atoms, preferably ethyl, methyl or n-propyl.

In one embodiment, $R^{90}$ and $R^{91}$ are each ethyl (compound of Formula III is diethylaminotriethoxysilane, DEATES). In another embodiment, $R^{92}$ is n-propyl and $R^{93}$ are each ethyl (compound of Formula IV is n-propyl triethoxysilane, nPTES) or in another embodiment $R^{92}$ is n-propyl and $R^{93}$ are each methyl (compound of Formula IV is n-propyl trimethoxysilane, nPTMS).

Preferably, the first heterophasic propylene copolymer (a) is prepared by a catalyst system comprising a Ziegler-Natta catalyst and at least one external electron donor chosen from the group of a compound having a structure according to Formula III $(R^{90})_2N—Si(OR^{91})_3$, a compound having a structure according to Formula IV: $(R^{92})Si(OR^{93})_3$ and mixtures thereof.

A "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst, such as triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminium, triethylaluminium, triisobutylaluminium, and/or trioctylaluminium. Most preferably, triethylaluminium (abbreviated as TEAL). The co-catalyst can also be a hydrocarbyl aluminum compound such as tetraethyl-dialuminoxane, methylaluminoxane, isobutyl-aluminoxane, tetraisobutyl-dialuminoxane, diethyl-aluminumethoxide, diisobutylaluminum chloride, methylaluminum dichloride, diethylaluminum chloride, ethylaluminum dichloride and dimethylaluminum chloride, preferably TEAL.

For example, the procatalyst may be prepared by a process comprising the steps of providing a magnesium-based support, contacting said magnesium-based support with a Ziegler-Natta type catalytic species, an internal donor, and an activator, to yield the procatalyst. For example, the Examples of U.S. Pat. No. 5,093,415 of Dow discloses an improved process to prepare a procatalyst. Preferably, the procatalyst is a chemical compound comprising titanium.

In the context of the present invention, the molar ratio between Si and Ti element in the catalyst system is preferably in the range from 0.1 to 40, preferably from 0.1 to 20, even more preferably from 1 to 20 and most preferably from 2 to 10. Preferably the molar ratio between Al and Ti element in the catalyst system is in the range from 5 to 500, preferably from 15 to 200, more preferably from 30 to 160, most preferably from 50 to 140.

In one embodiment, the molar ratio between Si and Ti element is the molar ratio between the external donor and the procatalyst.

In one embodiment, the molar ratio between Al and Ti element is the molar ratio between the co-catalyst and the procatalyst.

Inorganic Filler

Suitable examples of inorganic fillers include but are not limited to talc, calcium carbonate, wollastonite, barium sulfate, kaolin, glass fibers, laminar silicates (bentonite, montmorillonite, smectite) and mica.

For example, the inorganic filler is selected from the group consisting of talc, calcium carbonate, wollastonite, mica and mixtures thereof.

Preferably, the inorganic filler is a talc. The mean particle size of talc (D50) of talc is preferably in the range from 0.12 to 10.2 μm, preferably in the range from 0.23 to 5.1 μm, more preferably in the range from 0.36 to 0.86 μm, as determined according to ISO 13317-3:2001, sedimentation analysis, Stockes' law.

Second Heterophasic Propylene Copolymer

The polymer composition according to the present invention preferably further comprises a second heterophasic propylene copolymer (b), wherein the amount of the second heterophasic propylene copolymer (b) is in the range from 15 to 50 wt %, preferably in the range from 25 to 45 wt % based on the total amount of the polymer composition.

The second heterophasic propylene copolymer (b) preferably comprises a second propylene polymer (b1) as matrix and a second ethylene-α-olefin copolymer (b2) as dispersed phase.

The amount of the second propylene polymer (b1) is preferably in the range from 65 to 90 wt %, preferably from 79 to 88 wt % based on the total amount of the second heterophasic propylene copolymer (b).

The second propylene polymer (b1) in the second heterophasic propylene copolymer (b) can be a propylene homopolymer or/and a propylene-α-olefin copolymer wherein the α-olefin has 2 or 4 to 20 carbon atoms, for example the propylene-α-olefin can be a propylene-ethylene copolymer or a propylene-butene copolymer. Preferably the second propylene polymer (b1) in the second heterophasic propylene copolymer (b) is a propylene homopolymer.

The MFI (melt flow index) of the second propylene polymer (b1) in the second heterophasic propylene copolymer (b) is preferably in the range from 20 to 520 dg/min, preferably from 50 to 310 dg/min, more preferably from 140 to 260 dg/min as measured according to ISO1133-1:2011 at 230° C. with a 2.16 kg load.

The amount of the second ethylene-α-olefin copolymer (b2) is in the range from 10 to 35 wt %, preferably from 12 to 21 wt % based on the total amount of the second heterophasic propylene copolymer (b).

In the second heterophasic propylene copolymer (b), the amount of the moiety derived from ethylene is preferably in the range from 35 to 49 wt % based on the total amount of the second ethylene-α-olefin copolymer (b2).

The moiety of α-olefin in the second ethylene-α-olefin copolymer (b2) in the second heterophasic propylene copolymer (b) is preferably derived from at least one α-olefin having 3 to 20 carbon atoms, for example the second ethylene-α-olefin copolymer (b2) can be an ethylene-propylene copolymer, for example the second ethylene-α-olefin copolymer (b2) can be an ethylene-butene copolymer, for example the second ethylene-α-olefin copolymer (b2) can be an ethylene-hexene copolymer, for example the second ethylene-α-olefin copolymer (b2) can be an ethylene-octene copolymer, for example the second ethylene-α-olefin copolymer (b2) can be an ethylene-propylene-butene copolymer, for example the second ethylene-α-olefin copolymer (b2) can be an ethylene-propylene-hexene copolymer. Preferably the second ethylene-α-olefin copolymer (b2) in the second heterophasic propylene copolymer (b) is an ethylene-propylene copolymer.

Preferably the MFI of the second heterophasic propylene copolymer (b) is in the range from 20 to 100 dg/min, preferably in the range from 40 to 90 dg/min, preferably in the range from 55 to 83 dg/min, as determined according to ISO1133-1:2011 at 230° C. with a 2.16 kg load.

The second heterophasic propylene copolymer (b) can be divided into a second xylene-soluble portion (Second CXS)

and a second xylene-insoluble portion (Second CXI). The amount of the second xylene-soluble portion is preferably in the range from 12.1 to 20.6 wt %, preferably in the range from 16.0 to 18.3 wt %, based on the total amount of the second heterophasic propylene copolymer (b) as determined according to ISO16152:2005.

The intrinsic viscosity of the second xylene-soluble part (Second CXS) of the second heterophasic propylene copolymer (b) $IV_{Second\ CXS}$ is preferably in the range from 3.6 to 6.2 dl/g, preferably in the range from 4.5 to 5.8 dl/g as measured according to ISO1628-1:2009 in decalin at 135° C.

The second heterophasic propylene copolymer (b) is preferably a reactor grade heterophasic propylene copolymer.

The second heterophasic propylene copolymer (b) can be produced with process and catalyst known in the art.

In one embodiment, the second heterophasic propylene copolymer (b) is produced with the same process as the first heterophasic propylene copolymer (a).

In one embodiment, the second heterophasic propylene copolymer (b) is produced with the same catalyst as the first heterophasic propylene copolymer (a).

Optional Elastomer

Optionally the polymer composition according to the present invention comprises a polyolefin based elastomer. The polyolefin based elastomer is preferably an ethylene-α-olefin copolymer wherein the α-olefin has 3 to 20 carbon atoms, for example the ethylene-α-olefin copolymer is an ethylene-propylene copolymer, for example the ethylene-α-olefin copolymer is an ethylene-butene copolymer, for example the ethylene-α-olefin copolymer is an ethylene-hexene copolymer, for example the ethylene-α-olefin copolymer is an ethylene-octene copolymer or a combination thereof.

Preferably the polyolefin based elastomer is an ethylene-butene copolymer or/and an ethylene-octene copolymer.

Preferably the amount of moiety derived from ethylene in the polyolefin based elastomer is in the range from 45 to 90 wt %, preferably from 50 to 87 wt %, more preferably from 55 to 85 wt %, more preferably from 57 to 70 wt % based on the total amount of the polyolefin based elastomer.

The polyolefin based elastomer according to the present invention preferably has a shore A hardness in the range from 40 to 85, more preferably in the range from 51 to 79, more preferably in the range from 54 to 68 as measured according to ASTM D2240-15.

The density of the polyolefin based elastomer according to the present invention is preferably in the range from 0.853 to 0.905 g/cm3, preferably from 0.859 to 0.896 g/cm3, more preferably from 0.860 to 0.882 g/cm3, more preferably from 0.860 to 0.876 g/cm3 as measured according to ASTM D792-13.

The MFI of the polyolefin based elastomer is preferably in the range from 0.20 to 20.0 dg/min, preferably from 0.30 to 14.3 dg/min, more preferably from 0.40 to 7.2 dg/min as measured according to ASTM D1238-13 with a 2.16 kg load at 190° C.

The polyolefin based elastomer may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The polyolefin based elastomer may also be prepared using traditional types of heterogeneous multi-sited Ziegler-Natta catalysts.

Optional Additives

The polymer composition according to the present invention may further contain additives, for instance nucleating agents and clarifiers, stabilizers, release agents, plasticizers, anti-oxidants, lubricants, antistatics, cross linking agents, scratch resistance agents, pigments and/or colorants, flame retardants, acid scavengers, recycling additives, anti-microbials, anti-fogging additives, slip additives, anti-blocking additives, polymer processing aids and the like. Such additives are well known in the art. For a polymer composition with good properties, the amount of the additives is preferably to be at most 5.0 wt %, preferably at most 4.5 wt %, preferably at most 4 wt %, more preferably at most 3.8 wt % based on the total amount of the polymer composition.

Polymer Composition

The polymer composition according to the present invention comprises said first heterophasic propylene copolymer (a), said inorganic filler, preferably said second heterophasic propylene copolymer (b), optionally the polyolefin based elastomer and optionallly additives, wherein the amount of the first heterophasic propylene copolymer (a) is in the range from 18.2 to 79.7 wt %, preferably in the range from 20.2 to 77.3 wt % based on the total amount of the polymer composition. The amount of the inorganic filler is preferably in the range from 3.0 to 29.7 wt %, preferably in the range from 8.4 to 25.6 wt %, based on the total amount of the polymer composition.

The total amount of the first heterophasic propylene copolymer (a), the inorganic filler, the optional polyolefin based elastomer, the optional second heterophasic propylene copolymer (b) and the optional additives is preferably at least 95 wt %, preferably at least 97 wt %, preferably at least 98.5 wt %, preferably 100 wt % based on the total amount of the polymer composition.

The MFI of the polymer composition is preferably in the range from 5 to 100 dg/min, preferably in the range from 8 to 70 dg/min, more preferably in the range from 10 to 30 dg/min as measure according to ISO1133-1:2011 with a 2.16 kg load at 230° C. as in the MFI range from 10 to 30 dg/min, the polymer composition has an optimal balance between impact performance and processability.

The polymer composition according to the present invention can for example be prepared in an extrusion process by melt-mixing the first heterophasic propylene copolymer (a), the inorganic filler, the optional polyolefin based elastomer, the optional second heterophasic propylene copolymer (b) and the optional additives in an extruder.

The ash content of the polymer composition is in the range from 3.5 to 30.2 wt %, preferably in the range from 9.4 to 26.4 wt % based on the total amount of the polymer composition according to ISO 3451-1:2008 at 600° C. for 4 hours.

Foamed Article

The present invention further relates to a foamed article comprising the aforementioned polymer composition. The amount of the polymer composition is preferably at least 93 wt %, preferably at least 95 wt %, more preferably at least 96 wt % of the amount of the foamed article.

Generally, to prepare a foamed article, a polymer composition is mixed with a foaming agent. Then the mixture is heated to cause the polymer composition to melt and to cause the foaming agent to yield gas. Depending on the process, the resulting mixture is maintained as a gas-laden melt until it is dispensed in a controlled manner through orifices or into shaping cavities. When the foaming is complete, the foam article is allowed to solidify by cooling. Depending on the desired product shape, the process is either continuous (for example extrusion) or discontinuous, for example with injection molding or expansion foaming. Such processes are known in the art, e.g. from *Thermoplastic Foams*, by James L. Throne, Sherwood Publishers 1996, hereby incorporated by reference.

The foamed article according to the present invention has an expansion ratio in the range from 1.05 to 2.14, preferably in the range from 1.38 to 1.97, more preferably in the range from 1.49 to 1.82, wherein the expansion ratio is the ratio between the density of the polymer composition and that of the foamed article, wherein the density is measured according to ISO 1183-1:2012.

Preferably the foamed article according to the present invention is prepared in an injection molding foaming process thanks to its high production rate.

Among the various injection molding foaming processes known in the art, it is preferred that the foamed article is prepared in a core-back injection molding process. The core-back injection molding process can also be referred as mold motion process. A typical core-back injection molding process comprises the following sequential steps:

A process for the preparation of a foamed article comprising sequential steps of:
  Providing a mixture of a foaming agent and the polymer composition according to the invention;
  Melting the mixture to obtain a molten mixture;
  Injection molding the molten mixture into a mold;
  Applying a pressure to the molten mixture in the mold;
  Opening the mold at least partially to allow the molten mixture to form a soft foamed article and;
  Allowing the soft foamed article to solidify to form the foamed article and eject the foamed article from the mould.

The reason that a core-back injection molding process is preferred is that such process leads to a foamed article having an optimized surface quality.

The foaming agent according to the invention can either be a physical foaming agent or a chemical foaming agent, wherein the chemical foaming agent is a chemical that decomposes at specific temperature to liberate gas(es), wherein physical foaming agent are either volatile liquids or gas(es). Typical chemical foaming agent includes but is not limited to azodicarbonamide, sodium bicarbonate and 5-phenyl tetrazole. Preferably the foaming agent is a chemical foaming agent because it is easier to disperse a chemical foaming agent homogeneously in a polymer composition which leads to a more uniform foam structure.

Preferably the foamed article according to the present invention is for automotive applications. Preferably the formed article according to the present invention is for automotive exterior applications.

The foamed article according to the present invention has a good stiffness preservation and superior surface quality.

"Stiffness preservation" is the modulus ratio between the foamed article and a solid part made from the same material. In the context of the present invention, "good stiffness preservation" is meant that the modulus ratio between the foamed article and a solid article made from the same material is at least 0.87, more preferably at least 0.95, even more preferably at least 1.02, wherein the modulus of the foamed article is measured according to ISO 14125:1998 (Method B), wherein the modulus of the solid article is measured according to ISO 178:2010.

Typical surface defects of a foamed article include but are not limited to:
  Dimple: Shallow depression on the surface of the foamed article due to the collapse of the foam structure.
  Tiger stripe: Striped pattern of repeating glossy and dull sections perpendicular to the flow direction, this type of surface defect is described in WO2015091810A1, P1, L11-21.
  Strip: Flow mark defect in form of light/dull-colored strips typically formed by "frozen" bubbles during the injection molding, strips are along the flow direction.
  Wavy-reflection: a relatively uneven part surface which results a visual perception of waviness or wavy reflected image due to the lack of surface flatness.

"Superior surface quality" is meant that the surface of the foamed article is free of tiger stripes or strips, and the number of visible dimples is at most one. More preferably the foamed article is free of any surface defects.

For the avoidance of doubt, in the context of the present invention, the term "amount" can be understood as "weight"; "Melt flow index (MFI)" refers to the same physical property as "melt flow rate (MFR)".

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process. When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Materials

Polymer A, B, C and D are heterophasic propylene copolymers prepared in an Innovene™ process, wherein a sequential two-reactor setup was employed. Polypropylene homopolymers were produced in first reactor and propylene-ethylene copolymers were produced in the second reactor.

There were three component in the catalyst system in the polymerization process: A procatalyst, an external electron donor and a co-catalyst. The procatalyst was prepared according to the description in WO2016198344, page 36, "Procatalyst III" paragraph; The external electron donor used for Polymer A and B was di(iso-propyl) dimethoxysilane (DiPDMS), the external electron donor used for Polymer C and D was n-propyltriethoxysilane (nPTES); the co-catalyst was triethylaluminium.

The process condition of Polymer A, B, C and 0 are given in Table 1:

TABLE 1

Preparation condition of Polymer A, B, C and D

| Polymer | A | B | C | D |
|---|---|---|---|---|
| R1 Te (° C.) | 66 | 66 | 69.5 | 69.5 |
| R1 Pr (Bar) | 24 | 24 | 24 | 24 |
| Al/Ti (mol/mol) | 135 | 135 | 135 | 135 |
| Si/Ti (mol/mol) | 10 | 10 | 10 | 10 |
| R1 H2/C3 (mol/mol) | 0.08 | 0.05 | 0.01 | 0.065 |
| R1 split (wt %) | 80 | 74 | 76 | 86 |
| R2 Te (C) | 66 | 57 | 66 | 59 |
| R2 Pr (Bar) | 24 | 24 | 24 | 24 |
| R2 H2/C3 (mol/mol) | 0.132 | 0.005 | 0.011 | 0.0042 |
| R2 C2/C3 (mol/mol) | 0.63 | 0.33 | 0.3 | 0.31 |
| R2 split (wt %) | 20 | 26 | 24 | 14 |

In Table 1, R1 refers to the first reactor, R2 refers to the second reactor, Te refers to temperature, Pr refers to pressure, Al/IM is the molar ratio of the co-catalyst to the procatalyst, Si/Ti is the molar ratio of the external donor to the procatalyst, H2/C3 is the molar ratio of hydrogen to propylene, C2/C3 is the molar ratio of ethylene to propylene, split is the amount of substance produced in R1 or R2 based on the amount of the total Polymer A or B or C or 0 respectively.

Engage 8200 is an ethylene-1-octene elastomer commercially available from Dow, having a density of 0.870 g/cm3 (ASTM 0792-13), an MFI of 5.0 g/10 min (ASTM D1 238-13, 2.16 kg, 190° C.) and a shore A hardness of 66 (ASTM D2240-15).

Talc HTPultra 5c is an ultrafine talc commercially available from IMI FABI. The mean particle size of talc (D50) of Talc HTPultra 5c is 0.65 µm as measured according to sedimentation analysis, Stockes' law (ISO 13317-3:2001).

The additive package used consists of 70 wt % color masterbatch, 20 wt % heat and process stabilizers, 10 wt % processing aid based on the total amount of the additive package.

Chemical foaminging agent used in the present invention was PALMAROLE BA.M2.E and is commercially available from ADEKA.

SAMPLE PREPARATION

Compounding

Pellets of the Examples were prepared by compounding the components in amounts as indicated in Table 3 in a KraussMaffei Berstorff ZE40A_UTX 43D twin-screw extruder with the following setting: 400 rpm screw speed, 150 kg/h throught put, 38% torque, 235° C. as temperature and 13 bar as head pressure.

Injection Moulding

Solid articles were prepared by injection moulding the pellets of the Examples obtained in the compounding process. The dimensions of the solid articles are suitable for ISO 178:2010 measurement.

Foam Injection Moulding

Specimens for surface quality rating were foamed articles prepared by core-back foam injection moulding in an Arburg Allrounder 520H 1500-800 unit. The core-back foam injection moulding process consisted of the following sequential steps:

The pellets of an example obtained in the compounding step were dry-blended with a chemical foaming agent to create a mixture of pellets. The amount of the chemical foaming agent used was 4 wt % based on the total amount of the pellets;

The mixture of the pellets obtained in the dry-blending step was then added to the hopper of the injection moulding machine. The injection moulding machine settings used were: barrel temperature 240° C., mould temperature 75° C., Then the mixture of pellets was transferred from the hopper into the barrel and the pellets were allowed to become fully molten over a 20 s time period. The two mould halves were closed for form the mould cavity (The dimensions of the mould cavity are given in FIG. 1).

Figure 2:
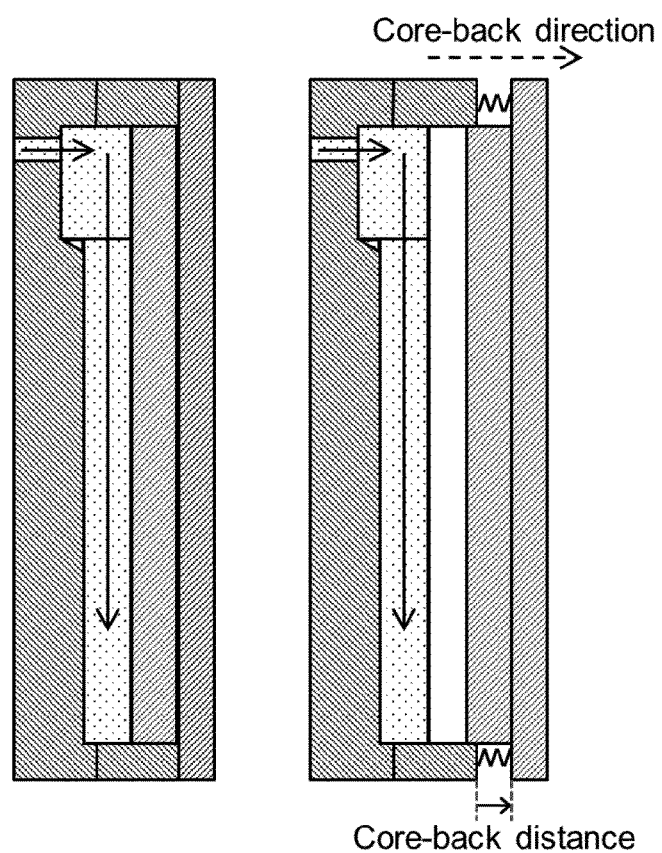

Then the molten mixture of pellets (melt) were injected into the mould cavity with an injection speed of 250 cm$^3$/s with a duration of the injection step of 0.21 s;

The injected melt was held in the mould for 5 s with a pressure of 400 bar, after which the mould was opened at a core-back distance of 1 mm in 1 s to let the injected melt expand into the foam (FIG. 2);

The mould halves were then held at the same position for 40 s;

Ejecting the foamed article for surface quality evaluation.

TEST METHOD

Melt Flow Index

Melt flow index (MFI) was measured according to ISO1133-1:2011 at 230° C. with a 2.16 kg load.

Weight percentage of the xylene-soluble portion (CXS) and weight percentage of the xylene-insoluble portion (CXI)

Weight percentage of the xylene-soluble portion (CXS) of the heterophasic propylene copolymers was determined according to ISO16152:2005. Weight percentage of xylene-insoluble portion (CXI) of the heterophasic propylene copolymers was calculated using the following equation:

$$CXI = 100 \text{ wt \%} - CXS$$

Both xylene-soluble and xylene-insoluble portions (CXS and CXI) obtained in this test were used in the intrinsic viscosity (IV) test.

Intrinsic Viscosity (IV)

Intrinsic viscosity (IV) of CXS and CXI was determined according to ISO1628-1:2009 and ISO1628-3:2010 respectively in decalin at 135° C.

Density

Density of the pellets of the polymer composition obtained in the compounding process and that of the foamed article obtained in the foam injection moulding process were measured according to ISO 1183-1:2012.

Stiffness

The modulus of the foamed articles was measured according to ISO 14125:1998; the modulus of the solid article was measured according to ISO 178:2010. "Stiffness preservation" was calculated as the modulus ratio between the foamed article and the solid part made from the same composition.

Ash Content

The ash content of the pellets of the polymer composition obtained in the compounding process was measured according to ISO 3451-1:2008 at 600° C. for 4 hours.

Surface Quality Evaluation

Foamed injection moulded articles were visually observed for occurrence of surface defect on both sides. The surface quality was evaluated on a rating of 1 to 3, 3 being the best.

| Surface quality rating | description |
|---|---|
| 1 | Visible strip along the injection moulding direction and/or visible tiger stripe and/or presence of at least two surface dimples<br>Dimple: Shallow depression on the surface of the foamed article due to the collapse of the foam structure.<br>Tiger stripe: Striped pattern of repeating glossy and dull sections perpendicular to the flow direction, this type of surface defect is described in WO2015091810A1, P1, L11-21.<br>Strip: Flow mark defect in form of light/dull-colored strips typically formed by "frozen" bubbles during the injection moulding, strips are along the flow direction. |
| 2 | At most one surface dimple and/or wavy reflection<br>Wavy-reflection: a relatively uneven part surface which results a visual perception of waviness or wavy reflected image due to the lack of surface flatness. |
| 3 | No surface defect visible |

Result

TABLE 2

Properties of HECOs

|  | Polymer A | Polymer B | Polymer C | Polymer D |
|---|---|---|---|---|
| MFI (g/10 min) | 40 | 14 | 12 | 77 |
| Weight fraction matrix (wt %) | 80 | 74 | 76 | 86 |
| CSX (wt %) | 18 | 22 | 22 | 14 |
| $IV_{CXS}$ (dl/g) | 2.2 | 4 | 1.9 | 5.3 |
| $IV_{CXI}$ (dl/g) | 1.3 | 1.4 | 1.3 | 1.3 |
| $IV_{CXS}/IV_{CXI}$ | 1.7 | 2.9 | 1.5 | 4.1 |

TABLE 3

Composition of polymer compositions and surface quality rating

|  |  | CE1 | CE2 | CE3 | CE4 | IE1 | IE2 | CE5 | CE6 | IE3 | IE4 | IE5 | IE6 |
|---|---|---|---|---|---|---|---|---|---|---|---|---|---|
| Polymer D | wt % |  |  |  |  |  |  | 75.1 | 59.1 | 30 | 30 | 30 | 41.1 |
| Polymer A | wt % | 75.1 | 64.1 |  |  |  |  |  |  |  |  |  |  |
| Polymer B | wt % |  |  |  |  | 75.1 | 69.1 |  |  | 35.1 | 46.1 | 45.1 | 21 |
| Polymer C | wt % |  |  | 75.1 | 67.1 |  |  |  |  |  |  |  |  |
| Engage 8200 | wt % |  | 11 |  | 8 |  | 6 |  | 16 | 10 | 10 |  | 13 |
| Talc | wt % | 22 | 22 | 22 | 22 | 22 | 22 | 22 | 22 | 22 | 11 | 22 | 22 |
| Additive package | wt % | 2.9 | 2.9 | 2.9 | 2.9 | 2.9 | 2.9 | 2.9 | 2.9 | 2.9 | 2.9 | 2.9 | 2.9 |
| MFI | dg/min | 32.8 | 26.5 | 26.4 | 21.7 | 14.6 | 12.9 | 61.7 | 36 | 21.3 | 24 | 25.5 | 25.9 |
| Ash content | wt % | 22.9 | 22.9 | 23.2 | 23.1 | 22.9 | 23.1 | 23.1 | 22.8 | 23 | 12 | 23.2 | 23.2 |
| Density of the pellets | g/cm3 | 1.07 | 1.07 | 1.07 | 1.07 | 1.07 | 1.07 | 1.07 | 1.07 | 1.07 | 1.00 | 1.07 | 1.07 |
| Density of the foamed article | g/cm3 | 0.65 | 0.65 | 0.65 | 0.65 | 0.65 | 0.65 | 0.65 | 0.65 | 0.65 | 0.61 | 0.65 | 0.65 |
| Expansion ratio |  | 1.65 | 1.65 | 1.65 | 1.65 | 1.65 | 1.65 | 1.65 | 1.65 | 1.65 | 1.65 | 1.65 | 1.65 |
| Modulus of the foamed article | MPa | 2580 | 1700 | 2340 | 1880 | 2320 | 2110 | 2920 | 1970 | 1920 | 1370 | 2320 | 1810 |
| Modulus of the solid article | MPa | 2825 | 2138 | 2455 | 2048 | 2636 | 2311 | 3197 | 1810 | 1848 | 1440 | 2278 | 1801 |
| Stiffness preservation |  | 0.91 | 0.80 | 0.95 | 0.92 | 0.88 | 0.91 | 0.91 | 1.09 | 1.04 | 0.95 | 1.02 | 1.00 |
| Surface quality rating |  | 1 | 1 | 1 | 1 | 2 | 2 | 1 | 1 | 3 | 2 | 2 | 2 |

As can be seen from IE1-IE6 in Table 3, the foamed article according to the present invention comprising a first heterophasic propylene copolymer (a) and an inorganic filler has a surface quality rating of at least 2. As can be seen from IE3-IE6, when the composition comprises the first heterophasic propylene copolymer (a) as well as the second propylene copolymer (b), the surface quality rating is at least 2 and the stiffness preservation is at least 0.95. In addition, as exemplified by IE3, where Polymer D is present as the second heterophasic propylene copolymer in the preferred amount, the surface quality rating is 3 and the stiffness preservation is at least 0.95.

The invention claimed is:

1. A foamed article comprising a polymer composition, wherein the polymer composition comprises a first heterophasic propylene copolymer (a) and an inorganic filler,
    wherein the xylene soluble part of the first heterophasic propylene copolymer (a) is in the range from 18.1 to 27.6 wt % as determined by ISO16152:2005 based on the total amount of the first heterophasic propylene copolymer (a),
    wherein the intrinsic viscosity of the xylene soluble part of the first heterophasic propylene copolymer (a) is in the range from 2.9 to 4.8 dl/g as measured according to ISO1628-1:2009 in decalin at 135° C.;
    wherein the melt flow index (MFI) of the first heterophasic propylene copolymer (a) is in the range from 5.6 to 65.0 dg/min as determined according to ISO1133-1:2011 at 230° C. with 2.16 kg load,
    wherein the amount of the first heterophasic propylene copolymer (a) is in the range from 18.2 to 79.7 wt % based on the total amount of the polymer composition,
    wherein the ash content of the polymer composition as measured according to ISO 3451-1:2008 at 600° C. for 4 hours is in the range from 3.5 to 30.2 wt % based on the total amount of the polymer composition,
    wherein the foamed article according to the present invention has an expansion ratio in the range from 1.05 to 2.14, wherein the expansion ratio is the ratio between the density of the polymer composition before foaming and that of the foamed article and wherein the density is measured according to ISO 1183-1:2012.

2. The foamed article according to claim 1, wherein the inorganic filler is a talc.

3. The foamed article according to claim 1 wherein the inorganic filler has a mean particle size (D50) in the range from 0.12 to 10.2 μm as measured according to ISO 13317-3:2001, sedimentation analysis, Stockes' law.

4. The foamed article according to claim 1 wherein the MFI of the first heterophasic propylene copolymer (a) is in the range from 8.6 to 45.1 dg/min as determined according to ISO1133-1:2011 at 230° C. with 2.16 kg load.

5. The foamed article according to claim 1 wherein the xylene soluble part of the first heterophasic propylene copolymer (a) is in the range from 20.3 to 24.2 wt % as determined by ISO16152:2005 based on the total amount of the first heterophasic propylene copolymer (a).

6. The foamed article according to claim 1 wherein the intrinsic viscosity of the xylene soluble part of the first heterophasic propylene copolymer (a) is in the range from 3.3 to 4.5 dl/g as measured according to ISO1628-1:2009 in decalin at 135° C.

7. The foamed article according to claim 1 wherein the MFI of the polymer composition is in the range from 5 to 100 dg/min as a measured according to ISO1133-1:2011 with a 2.16 kg load at 230° C.

8. The foamed article according to claim 1 wherein the polymer composition further comprises a second heterophasic propylene copolymer (b), wherein the amount of the second heterophasic propylene copolymer (b) is in the range from 15 to 50 wt % based on the total amount of the polymer composition.

9. The foamed article according to claim 8, wherein the MFI of the second heterophasic propylene copolymer (b) is in the range from 20 to 100 dg/min as determined according to ISO1133-1:2011 at 230° C. with 2.16 kg load.

10. The foamed article according to claim 9, wherein
    the xylene soluble part of the first heterophasic propylene copolymer (a) is in the range from 20.3 to 24.2 wt % as determined by ISO16152:2005 based on the total amount of the first heterophasic propylene copolymer (a);
    the intrinsic viscosity of the xylene soluble part of the first heterophasic propylene copolymer (a) is in the range from 3.8 to 4.3 dl/g as measured according to ISO1628-1:2009 in decalin at 135° C.;
    the MFI of the first heterophasic propylene copolymer (a) is in the range from 12.3 to 18.2 dg/min as determined according to ISO1133-1:2011 at 230° C. with 2.16 kg load;
    the amount of the first heterophasic propylene copolymer (a) is in the range from 20.2 to 77.3 wt % based on the total amount of the polymer composition;
    the MFI of the polymer composition is in the range from 10 to 30 dg/min as measured according to ISO1133-1:2011 with a 2.16 kg load at 230° C.;
    the MFI of the second heterophasic propylene copolymer (b) is in the range from 55 to 83 dg/min as determined according to ISO1133-1:2011 at 230° C. with 2.16 kg load; and
    the xylene soluble part of the second heterophasic propylene copolymer (b) is in the range from 16.0 to 18.3 wt % as determined by ISO16152:2005 based on the total amount of the second heterophasic propylene copolymer (b).

11. The foamed article according to claim 8, wherein the xylene soluble part of the second heterophasic propylene copolymer (b) is in the range from 12.1 to 20.6 wt % as determined by ISO16152:2005 based on the total amount of the second heterophasic propylene copolymer (b).

12. The foamed article according to claim 8, wherein the intrinsic viscosity of the xylene soluble part of the second heterophasic propylene copolymer (a) is in the range from 4.5 to 5.8 dl/g as measured according to ISO1628-1:2009 in decalin at 135° C.

13. The foamed article according to claim 8, wherein the polymer composition further comprises a polyolefin based elastomer and additives, wherein the total amount of the first heterophasic propylene copolymer (a), the inorganic filler, the polyolefin based elastomer, the second heterophasic propylene copolymer (b) and the additives is at least 95 wt % based on the total amount of the polymer composition.

14. The foamed article according to claim 1, wherein the amount of the polymer composition is at least 93 wt % of the amount of the foamed article.

15. A process for the preparation of a foamed article comprising sequential steps of:
    providing a mixture of a foaming agent and the polymer composition of claim 1;
    melting the mixture to obtain a molten mixture,
    injection molding the molten mixture into a mold,
    applying a pressure to the molten mixture in the mold, opening the mold at least partially to allow the molten mixture to form a soft foamed article and;

allowing the soft foamed article to solidify to form the foamed article and eject the foamed article from the mold.

16. An article comprising the foamed article of claim 1 wherein the article is an automotive part.

17. The foamed article according to claim 1, wherein:

a modulus ratio between the foamed article and a solid article made from the same material is at least 0.95, the modulus of the foamed article is measured according to ISO 14125:1998 (Method B), and the modulus of the solid article is measured according to ISO 178:2010.

18. The foamed article according to claim 1, wherein:

a modulus ratio between the foamed article and a solid article made from the same material is at least 1.02, the modulus of the foamed article is measured according to ISO 14125:1998 (Method B), and the modulus of the solid article is measured according to ISO 178:2010.

* * * * *